US011953440B2

(12) United States Patent
B. Nieder et al.

(10) Patent No.: US 11,953,440 B2
(45) Date of Patent: Apr. 9, 2024

(54) METHOD AND APPARATUS FOR SIMULTANEOUS NONLINEAR EXCITATION AND DETECTION OF DIFFERENT CHROMOPHORES ACROSS A WIDE SPECTRAL RANGE USING ULTRA-BROADBAND LIGHT PULSES AND TIME-RESOLVED DETECTION

(71) Applicants: SPHERE ULTRAFAST PHOTONICS SL, Corunha (ES); INL—INTERNATIONAL IBERIAN NANOTECHNOLOGY LABORATORY, Braga (PT)

(72) Inventors: Jana B. Nieder, Braga (PT); Francisco Silva, Vila Cha VCD (PT); Christian Maibohm, Braga (PT); Helder Crespo, Matosinhos (PT); Rosa Romero, Oporto (PT)

(73) Assignees: SPHERE ULTRAFAST PHOTONICS SL, Corunha (ES); INL—INTERNATIONAL IBERIAN NANOTECHNOLOGY LABORATORY, Braga (PT)

(*) Notice: Subject to any disclaimer, the term of this patent is extended or adjusted under 35 U.S.C. 154(b) by 785 days.

(21) Appl. No.: 17/047,249

(22) PCT Filed: Apr. 10, 2019

(86) PCT No.: PCT/IB2019/052961
§ 371 (c)(1),
(2) Date: Oct. 13, 2020

(87) PCT Pub. No.: WO2019/198009
PCT Pub. Date: Oct. 17, 2019

(65) Prior Publication Data
US 2021/0164905 A1 Jun. 3, 2021

(30) Foreign Application Priority Data

Apr. 10, 2018 (PT) .......................................... 110675

(51) Int. Cl.
*G02B 21/00* (2006.01)
*G01N 21/64* (2006.01)

(52) U.S. Cl.
CPC ..... *G01N 21/6458* (2013.01); *G01N 21/6408* (2013.01); *G01N 21/6486* (2013.01);
(Continued)

(58) Field of Classification Search
CPC .............. G02B 21/0032; G02B 21/006; G02B 21/0076; G02B 21/00; G02B 21/0004;
(Continued)

(56) References Cited

U.S. PATENT DOCUMENTS

2010/0321767 A1* 12/2010 Borguet ............... G02F 1/39
359/326
2011/0274135 A1* 11/2011 Kaertner ............. G02B 17/004
372/99
2016/0238532 A1 8/2016 Freudiger et al.

FOREIGN PATENT DOCUMENTS

CN 107290322 A 10/2017
WO 2017120647 A1 7/2017

OTHER PUBLICATIONS

Daan Brinks, et al., Coherent Control of Single Molecules at Room Temperature, Faraday Discussions, vol. 153, pp. 51-60, 2011.
(Continued)

*Primary Examiner* — Arnel C Lavarias
(74) *Attorney, Agent, or Firm* — LUCAS & MERCANTI, LLP

(57) ABSTRACT

The described method and system allow the simultaneous detection of multicolored samples, e.g. in live cells or tissues, in a simple experimental geometry. It relies on
(Continued)

combining ultrashort ultra-broadband laser sources (10) with a fluorescence microscope setup able to collect fluorescence intensities and/or photon arrival times per excitation volume, as well as nonlinear signals, such as second/third-harmonic and sum-frequency generation. In the description, the presented method is referred to as "SyncRGB method".

14 Claims, 2 Drawing Sheets

(52) U.S. Cl.
CPC ....... *G02B 21/0032* (2013.01); *G02B 21/006* (2013.01); *G02B 21/0076* (2013.01); *G01N 2201/0697* (2013.01)

(58) Field of Classification Search
CPC .............. G02B 21/002; G02B 21/0024; G02B 21/0052; G02B 21/0064; G02B 21/0072; G02B 21/008; G02B 21/0084; G02B 21/06; G02B 21/16; G02B 21/36; G02B 21/361; G02B 21/365; G02B 21/367; G01N 21/6458; G01N 21/6408; G01N 21/6486; G01N 2201/0697; G01N 21/6456; G01N 2201/0696
USPC ............... 359/368, 362, 363, 369, 385, 388; 356/402, 405, 406, 407
See application file for complete search history.

(56) References Cited

OTHER PUBLICATIONS

Jiang Qin, et al., Imaging Ultrafast Plasmon Dynamics Within a Complex Dolmen Nanostructure Using Photoemission Electron Microscopy, Chinese Physics Letters, vol. 33, No. 11, pp. 116801-1-116801-5, 2016.
International Search Report and Written Opinion for Corresponding International Application No. PCT/IB2019/052961 (dated Jul. 11, 2019) (16 Pages).

* cited by examiner

METHOD AND APPARATUS FOR SIMULTANEOUS NONLINEAR EXCITATION AND DETECTION OF DIFFERENT CHROMOPHORES ACROSS A WIDE SPECTRAL RANGE USING ULTRA-BROADBAND LIGHT PULSES AND TIME-RESOLVED DETECTION

CROSS-REFERENCE TO RELATED APPLICATIONS

This application is a 371 of PCT/IB2019/052961, filed Apr. 10, 2019, which claims the benefit of Portuguese Patent Application No. 110675, filed Apr. 10, 2018, both applications are incorporated herein by reference.

TECHNICAL FIELD OF THE INVENTION

The present invention relates to a method and apparatus for simultaneous nonlinear bioimaging.

BACKGROUND

Light microscopy and especially multi-photon microscopy (MP-microscopy) has been a cornerstone of bioimaging for years. MP-microscopy allows for high resolution imaging in the optical plane while sectioning of the sample in the depth direction is performed by the intrinsic spatial confinement of the nonlinear process creating a strong contrast of the focal volume against the background. Confinement of the focal volume in three dimensions makes it possible to construct 3D images by moving the focal volume through the sample. Also, the information contained by each pixel in the 3D image can result from different nonlinear interaction processes and measurement modalities, i.e. fluorescence intensity, fluorescence lifetime or harmonic generation. Chromophores of the sample are excited by a pulsed laser source, typically with a narrow bandwidth compared to the absorption spectrum of a typical dye, e.g. in the case of a conventional ~100 fs pulsed laser system centered at 800 nm, the laser spectrum has a narrow bandwidth of ~15 nm FWHM, which covers typically only a fraction of a dye absorption spectrum, the latter typically covering spectral ranges in the visible spectrum, with bandwidths of ~100 nm. A highly desired method, especially in biological samples, is to obtain efficient simultaneous excitation of multiple chromophores and nonlinear signal generating structures, while being able to distinguish their signals.

Several techniques towards this goal have been implemented over the last years that show several limitations that are overcome by the invention now disclosed.

The first example combines two commercial femtosecond laser systems [Spectra-Physics Tsunami (750-950 nm) and Mai Tai (960-1040 nm) with an additional OPAL optical parametric oscillator (OPO) to extend the wavelength range of the Mai Tai system (1100-1600 nm)[1]. The system at any given time produces two distinct excitation laser wavelengths, either from the Tsunami and Mai Tai system or from the Tsunami and Mai Tai with additional OPAL system. The setup includes four detectors (Blue 447±30 nm, Green 520±17.5 nm, Red 580±30 nm and Deep Red 697±25 nm) and is therefore able to simultaneously detect up to four chromophores if the absorption spectra overlap with the two selected excitation wavelengths.

The second example consists of using a femtosecond (fs) laser, an OPO and a delay line for temporal synchronization of laser pulses [2]. This setup when the two lasers are unsynchronized can generate blue and red two photon fluorescence and higher harmonic generation. When the pulses from the fs laser and the OPO are synchronized gives rise to so-called two-beam processes, such as sum-frequency generation and two-color two-photon fluorescence (the two fs pulses which are combined have different frequency).

The third example uses one femtosecond fiber laser at 1550 nm, followed by double red-shifting of the main laser spectrum by a photonic crystal fiber (PCF), hence producing two additional wavelengths, with all three wavelengths subsequently frequency doubled to produce fixed excitation wavelengths centered at 775, 864 and 950 nm [3].

The fourth example is a similar principle where a 1030 nm (near-infrared) fs laser and a nonlinear fiber are used to simultaneous create both blue- (600-800 nm) and red-shifted (1.2-1.4 µm) Cherenkov radiation [4], A source filter is used to select one of the three excitation bands at the time and emissions filter for the three channels (Blue, Green and Red).

The four examples above use the intensity signal as modality in order to distinguish different chromophores.

Fluorescence Lifetime imaging microscopy (FLIM) is an alternative method to distinguish several fluorophores not by their intensity but by their fluorescence lifetime contrast. This method can be used to distinguish dyes that have similar absorption spectra, but different excitation state lifetimes. Often this technique is also used to sense differences in local pH, temperature or other physical parameters which influence the excited state lifetime of a dye. The FLIM technique is typically implemented with excitation sources such as pulsed picosecond diode lasers of a single wavelength or tunable femtosecond laser sources and signal detection is either with a single detector, multiple detectors or a grating coupled to a detector array [6].

The above-mentioned methods are limited by: (a) single laser excitation wavelengths that require scanning the laser wavelength or selecting one laser wavelength after another resulting in non-simultaneous tracking of all the chromophores in a single scan; (b) using multiple laser wavelengths resulting in increasing probability of photo induced toxicity in the sample; (c) challenging co-alignment of such multiple lasers at the focus of an objective; (d) requirement of pulse compression of each laser at the sample plane for optimized signal generation in a microscope setup; (e) Limitation of the FLIM technique: one photon excitation does not allow deep tissue illumination. (f) One photon multiline excitation scheme may result in overlap of excitation and emission spectra requiring complex filtering e.g. with multiline filters—associated to signal loss.

With our invention, the SyncRGB method, we overcome the limitations (a)-(f) and provide an easy to implement system that requires minor alignment skills and procedures.

SUMMARY

The present application discloses a method for simultaneous nonlinear imaging comprising:
 a) Emitting ultrashort ultra-broadband light pulses;
 b) Controlling the ultrashort ultra-broadband light pulses temporal duration in the sample plane;
 c) Focusing the ultrashort ultra-broadband light pulses in the sample plane;
 d) Preventing the ultrashort ultra-broadband light pulses from directly reaching the detection system;
 e) Measuring the generated nonlinear signals from the sample plane;

f) Scanning the excitation and measurement on individual points (1D), or point-by-point in a sample plane (2D), or point-by-point across focal planes (3D);
g) Synchronizing the measurement of the generated nonlinear signals from the sample plane to a fast detector in order to acquire time resolved nonlinear signal information from the sample plane;
h) Processing the time resolved nonlinear signal information;
i) Analysing the time resolved non-linear signal for each data point.

In a possible embodiment, in the method, the sample interacts with at least two photons from the ultrashort ultra-broadband light pulses generating a non-linear response comprising at least two photon fluorescence, higher harmonic generation, sum-frequency generation or difference-frequency generation.

In a possible embodiment, the time resolved nonlinear signal information in the method obtained via Time-domain FLIM by gated image intensifiers, Frequency-domain FLIM, time correlated single photon counting or streak camera.

In a possible embodiment, the method processes the time resolved nonlinear signal comprising any 1D, 2D or 3D image representation correlating measured non-linear signal information with a specific sample position.

In a possible embodiment, the method analyses the time resolved nonlinear signal including determination of decay times.

The present application also discloses an excitation light system configured to perform the above mentioned method for the simultaneous nonlinear imaging, comprising:
a) An excitation light system;
b) A pulse characterization and compression section configured to control the excitation light system to deliver near-transform-limited pulses;
c) A focus unit to produce a near diffraction-limited laser spot of the excitation light system at the sample plane;
d) Means to guide the excitation light system to the sample and consequently direct the nonlinear signal to the detectors;
e) A section to prevent the excitation light from the excitation light system from directly reaching the detectors;
f) A detection section able to detect single photons and photon arrival times from the generated non-linear signal from the sample at the sample plane;
g) A scanning section able to perform excitation and measurement on individual points (1D) or point-by-point in the sample plane (2D) or point by point across focal planes (3D);
h) A control section for correlation the detection with the scanning in order to acquire nonlinear signal associated to the scanning position(s) at the sample plane;
i) A signal processing section able to provide information related with the time resolved nonlinear signal;
j) An analysis section software for determination of decay parameters associated to the photon arrival time histograms in each data point.

In a possible embodiment, the excitation light system comprises an ultrashort ultra-broadband pulsed femtosecond light laser able to generate Fourier limited durations of sub-100-fs pulses.

In a possible embodiment, the pulse characterization and compression section of the excitation light comprises characterization techniques that enable the measurement of the spectral phase and using the spectral phase information to compress the ultra-broadband excitation laser pulse to near Fourier-limited ultrashort durations at the sample plane.

In a possible embodiment, the focus unit of an excitation light system comprises one of the following optical elements: single lens, lens combinations, microscope objectives, immersion objectives, dipping objectives and focusing mirrors.

In a possible embodiment, the means to guide said excitation light system to the sample and the subsequently generated nonlinear signal to the detectors comprise at least one of the following optical elements: metal mirror, dichroic mirror, prisms, gratings, or combinations of these elements.

In a possible embodiment, the section to prevent the excitation light from reaching the detection system in the excitation light system is realized by optical filters including band pass, short pass and multiband filters, or wavelength selective detection units, using dispersive elements, such as prisms, gratings to achieve wavelength selection, or using detectors with selective wavelength range sensitivity e.g. due to the optoelectronic transducer being based on optical active material with sensitivity in one or multiple specific wavelength range(s).

In a possible embodiment, the sample plane of an excitation light system comprises a photo multiplier tube, PMT, fast photodiode, avalanche photodiode, Streak camera, EM-CCD or sCMOS.

In a possible embodiment, the detection section of the excitation light system is used to detect specific portions of the nonlinear signal from the sample at the sample plane.

In a possible embodiment, the scanning section of the excitation light system comprises micro scanners, nano scanners, piezo scanners or galvo scanners.

In a possible embodiment, the control section for correlation of the detection with the scanning in the excitation light system is performed via a device control software, such that detected nonlinear signal from the sample plane can be correlated with the scanning position point(s) in 1D, 2D or 3D space.

In a possible embodiment, the signal processing section resolved nonlinear signal information of the excitation light system is correlated with the sample position via a data processing software, or manually.

In a possible embodiment, the excitation light system comprises an analysis section software able to determine decay parameters from photon arrival time histograms.

General Description

To overcome the limitations of the methods in the prior art, it is applied an ultrafast ultra-broadband source for the simultaneous excitation of multiple chromophores, even if the corresponding two photon absorption spectra are spectrally well separated.

In this application, it is considered that an ultrabroadband laser is a laser that emits a spectrum with a bandwidth capable of supporting few-cycle pulses. For example, if the laser has a center wavelength of 800 nm, it is considered an ultra-broadband laser if its spectrum has more than 100 nm of bandwidth. This corresponds to a 10 fs pulse (less than 4 optical cycles in duration), assuming a Gaussian spectral and temporal profile. For few-cycles, it is considered that a few-cycle laser pulse contains only a few oscillation of the electric field under its temporal envelope, where each oscillation is called a cycle. A few-cycle laser pulse typically has between 1 and 5 cycles under its envelope.

Recently, ultra-broadband lasers were used for coherent control experiments in a microscope configuration [7-9], but to our knowledge our invention is the first where a ultrashort few-cycle, sub 10 fs, laser is used for simultaneous multicolor bioimaging. We demonstrate advantageous performance with relevant/representative samples, namely a multicolor labelled 2D cell sample, as well as a tissue slice, when comparing multicolor and deep tissue imaging quality with that of a standard (e.g., >100 fs) pulsed fs laser source.

In this application, it is considered that an ultrashort pulse laser is a laser that emits ultrashort light pulses, with temporal durations in the femtosecond to ten picosecond range. In this invention, we refer to femtoseconds.

By using an ultrashort (few-cycle) pulsed femtosecond broadband laser, several chromophores can be excited simultaneously and detection can either be resolved based on fluorescence lifetime or time-integrated intensity information.

The SyncRGB method builds on the principle of MP-microscopy, where two or longer wavelength photons are combined to excite the chromophore. In a MP-microscope the laser source is directed to the sample by a dichroic mirror and through a high numerical aperture (high NA) microscope objective. The main components of a MP-microscope setup can either be acquired separately and put together for a customized microscope solution or bought as a full integrated turnkey microscope solution.

The use of an ultra-broadband laser source implies that for the same average power the intensity per wavelength is lower than in a narrowband laser source at the same average power, because the total laser power is distributed over a large area in frequency space. Since the fluorescence intensity depends nonlinearly on the excitation intensity (quadratic for two photon processes) and has a $\tau^{-1}$ dependence on the pulse duration $\tau$, if the pulse is transform-limited, the use of an ultrashort pulse system can provide enough signal even when there is only a partial overlap of the excitation spectra with the absorbing spectra of the chromophore, as illustrated by FIG. 3.a.

For optimal signal-to-noise ratio and signal strength, full broadband pulse delivery and compression at the focus is needed. To optimize dispersion-related distortions of the temporal pulse profile at the focus, especially after the pulses cross highly dispersive elements like the high NA objective, we use the robust, single beam and well-proven d-scan pulse characterization technique [10,11].

The configuration of our invention enables parallel, simultaneous detection of various colours, which is a prerequisite for observation of real time protein-protein interactions in live cells and for tracking of clinically relevant bioenergetics of cells.

Implementation of the SyncRGB method requires: an ultrashort ultra-broadband pulsed laser source coupled to a microscope, a measurement and control system to compress and characterize the ultrashort ultra-broadband pulsed laser, a dynamic detection, filter means for wavelength selective detection of the signal, a control software that warranties synchronized scanning and signal collection, a data analysis software for signal analysis in each data point.

The dynamic detection could be implemented using time correlated single-photon counting electronics, and the filter means could be bandpass filters, short pass filters or detectors sensitive in specific wavelength ranges.

Main advantages of the method are that (i) different types of chromophores are detected in a single scan without laser tuning or multiple lasers and (ii) signal detection can be done with only one photon counting detector. Thus, the SyncRGB system is faster, leads to less phototoxicity and is much easier to set up and use, thereby creating a much less expensive system which is more accurate than conventional systems and methods.

Compensation of the pulse chirping introduced by dispersive optical elements in the microscope via pulse optimization of the ultra-broadband laser source at the sample plane allows optimized conditions at multiple wavelengths suited to excite multiple types of chromophores.

The multiphoton excitation creates a very small and well-defined volume in three dimensions with very high intensity, which is therefore well-discriminated against the background.

We foresee similar benefits of using such ultra-broadband laser source for nonlinear microfabrication via multiphoton absorption processes in a light sensitive material or via an ablation process.

BRIEF DESCRIPTION OF THE DRAWINGS

For an easier understanding of the present application, the appended figures represent embodiments that, however, do not intend to limit the art disclosed herein.

DESCRIPTION OF AN EMBODIMENT

One embodiment of the invention is described. The description of this embodiment is exemplary and not intended to limit the scope of the invention.

Figure 1:
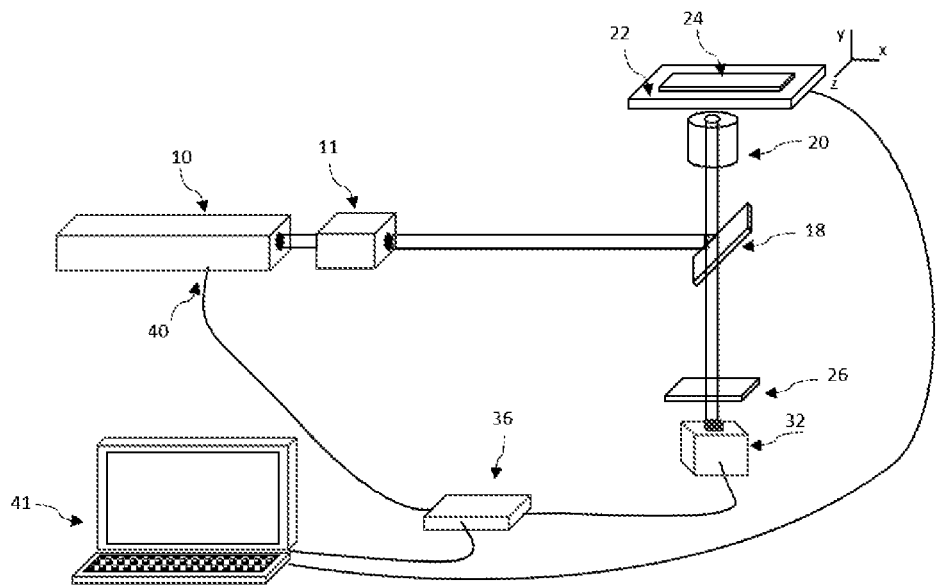
FIG. 1: Schematic drawing of our apparatus in accordance with the present invention.
Figure 2:
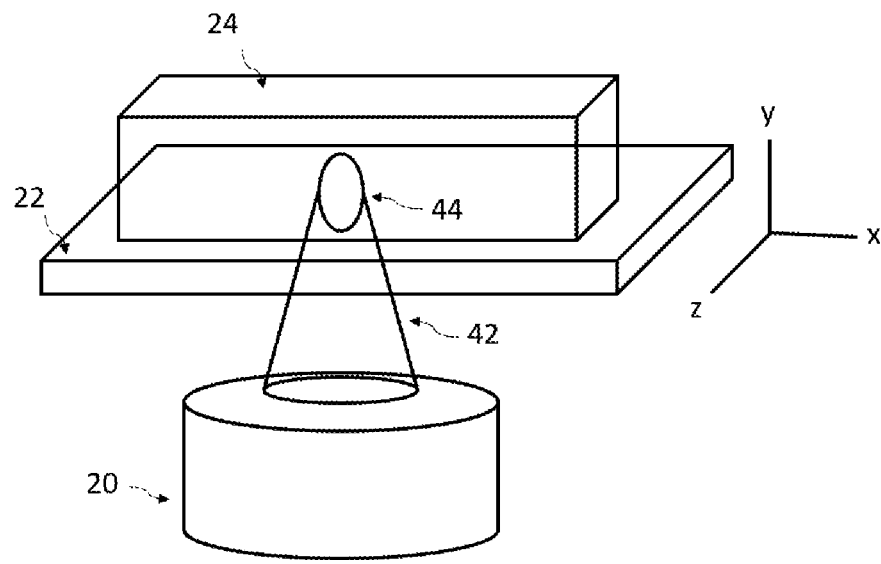
FIG. 2: Zoom of sample plane in accordance with the present invention.

The schematic drawing of the system is given in FIG. 1, which shows the main components of the SyncRGB method, together with a zoom view of the sample plane in FIG. 2. The ultrashort ultra-broadband light source (10) is compressed using an optical pulse compressor (11). An electronic sync signal (40) that contains the repetition rate information of the light source shall be connected for synchronization with the detection electronics (36). The ultrashort ultra-broadband light passes a partly reflecting optical element (18) before reaching the focussing element (20) which focuses the ultrashort ultra-broadband light into the sample (24). The focal volume is spatially scanned through the sample either by stage scanning (22) or beam scanning (option not shown in figure). The scanning is controlled by a software interface, while for a single point measurement no control software is required. The nonlinear signal is detected with a photon counting detector (32), on the way to the detector remaining ultrashort ultra-broadband light is prevented from reaching the detection system either by an optical element (26) or by using an optoelectronic transducer that is insensitive to the wavelength range of the ultrashort ultra-broadband light of the light source. The electronic signal of the detector is connected to the photon counting electronics (36) and together with the information of the sync signal, the time resolved signal can be retrieved and read out by the computer (41) to build photon arrival time histograms.

The computer is used to control the scanner (22) detection with the scanning in order to acquire the nonlinear signal associated to the scanning position(s) at the sample plane. Data is read out with a computer (41). From the collected photon arrival time histograms, fluorescence lifetimes can be determined using a fitting algorithm, even if the pixel contains multiple chromophores. From the photon arrival time histograms in each scanning volume or pixel, a 2D or 3D intensity of FLIM image can be created.

Figure 3:
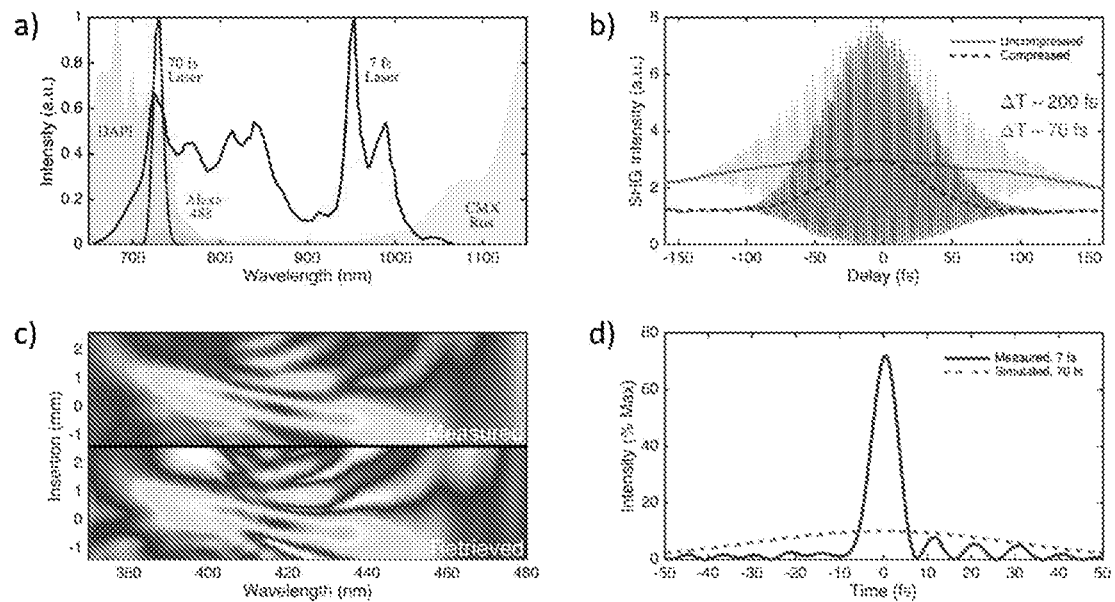
FIG. 3: Pulse characterization and compression d-scan traces of the ultra-broadband laser source and examples of sample and laser sources of one specific embodiment in accordance with the invention. a) Normalized spectra of a narrowband fs and of an ultra-broadband 7 fs laser system with single-photon absorption spectra of typical fluorescent dyes that form part of a sample. b) Autocorrelation measurements of the 70 fs laser in the uncompressed (grey curves, 200 fs pulse width) and compressed (black curves, 70 fs pulse width) configurations, measured at the focus of the microscope objective (see element 44 in FIG. 2). The Fourier-limited duration of the narrowband laser is 70 fs, hence the autocorrelation measurements indicate that the laser is close to optimum compression. c) d-scan measurements of the ultra-broadband laser at the focus (44). Top: Measured d-scan trace. Bottom: Retrieved d-scan trace, corresponding to a 7 fs pulse at optimum compression. d) Comparison of measured pulse intensity profiles. Black curve—7 fs laser pulse measured at the focus (44) with d-scan, having almost 80% of the power in the transform-limited peak. Grey curve: Gaussian laser pulse with 70 fs intensity FWHM and the same average laser power as the 7 fs pulse. The peak intensity achievable with the narrowband 70 fs laser is approximately 10 times lower than for the 7 fs ultra-broadband laser.
Figure 4:
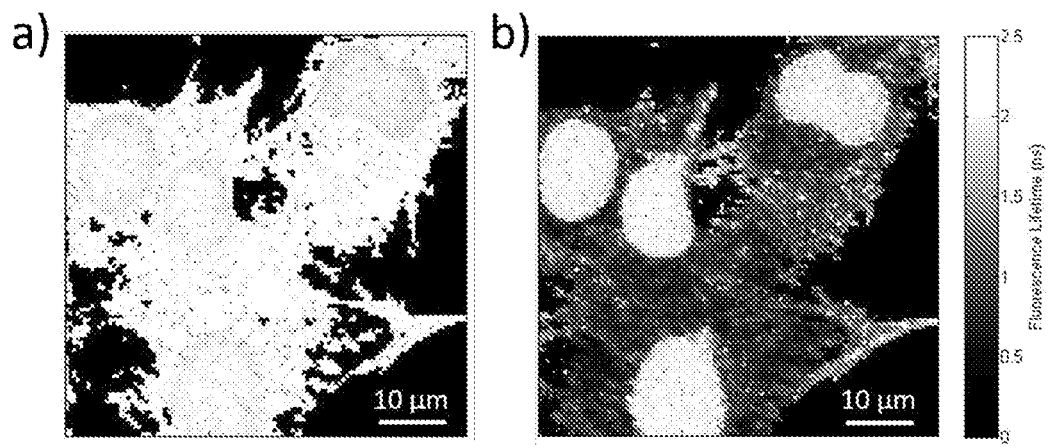
FIG. 4: Comparison of a (a) standard MP FLIM using a single narrowband fs laser and (b) SyncRGB FLIM data obtained with one embodiment of the invention using an ultra-broadband laser for MP-FLIM measurements. (a) MP FLIM image of 2D FluoCells® #1 obtained with 70 fs narrowband laser system at 730 nm, showing only resonant absorption with DAPI in the cell nuclei (white) and Alexa Fluor™ 488 in the cytoplasm (white), that have similar lifetimes and giving rise to one lifetime throughout the cell. Other areas in the cytoplasm do not show any signal (black). (b) 7 fs ultra-broadband few-cycle laser system resonant with all three chromophores (DAPI, Alexa™ 488 and Mito Tracker® Red labelling the mitochondria located in the cytoplasm) in the sample simultaneously, giving rise to three distinct lifetimes throughout the cell and enabling clear identification of distinctive cell constituents (white—nucleus/DAPI, light grey—actin filaments/Alexa™ 488, dark grey—mictochondria/MitoTracker®). Both images were taken with 36 mW average power for both laser systems with 110×110 pixels and a pixel dwell time of 30 ms.

Results from a specific embodiment of our invention, where we use an ultrashort ultra-broadband Ti:Sapphire laser with pulse spectra covering the spectral range from 690 to 1040 nm are given in FIG. 3 and FIG. 4.

The few-cycle laser is compressed at the focus of the microscope objective using the d-scan method by recording the d-scan traces (see FIG. 3*c*), which can be used to determine the spectral phase of the laser pulse and to compress the pulse to its transform-limited pulse length, ~7 fs (see FIG. 3*d*). We show additionally the spectrum of a standard fs laser (here a Spectra-Physics Tsunami system) (FIG. 3*a*) and the interferometric autocorrelation curves obtained when uncompressed (see FIG. 3*b*, dark grey) with a pulse length of about ~200 fs and when compressed compensating for dispersion on the way to the focus of the microscope objective (light grey) reaching approximately a transform-limited pulse duration of ~70 fs.

The laser repetition rate is 80 MHz for both laser systems. The SYNC signal is picked up by a fast photodiode connected to a fast electronic correlation card for synchronized time-correlated single photon counting (TCSPC) measurements.

The femtosecond laser is coupled to a microscope platform, passing a partly reflective/transmissive metallic mirror and focused using a microscope objective, and signal collected in epi-configuration after passing a 680 nm short pass filter and additional two filters mounted in series. The detector is a Photon Counting PMT. The detector output is connected to the fast electronic correlation card.

We use the SyncRGB method to analyse the nonlinear signal from three fluorescent molecule types with emission in the visible range, which we define here as the R: red, G: green and B: blue RGB range, from about 400 to 700 nm, using the broadband femtosecond laser for two photon excitation and TCSPC technology for time resolved nonlinear signal acquisition.

The sample chosen is a fixed cell sample (FluoCell® #1, Thermofisher) labelled with three different dyes. In FIG. 3*a* we show the two-photon absorption spectra of those three dyes with absorption across the RGB range, namely, DAPI, Alexa™ 488, and CMXRoc (MitoTracker® Red).

The sample is mounted on a sample holder on top of a computer-controlled scanning stage. The stage is scanned to move the sample through the excitation voxel. Using a control software interface the scan position can be correlated with the nonlinear signal information from the sample plane.

The nonlinear signal information is processed to reconstruct image data (see FIG. 4). In each position, time resolved nonlinear signal information is detected and collected in the form of photon arrival time histograms. These signals are subsequently analysed using a decay curve analysis method. Here the mean decay time is determined by building the mean over the weighed decay components resulting from a multiexponential fit of the photon arrival time histograms.

The merits of the SyncRGB method become evident when comparing the obtained information with a standard Multi-Photon Fluorescence Lifetime Imaging Microscopy (MP-FLIM) configuration based on a relatively narrowband femtosecond laser.

While for the narrowband laser the excitation power is available only in a restricted spectral range and only a fraction of the dyes with visible emission are resonantly excited via a two photon absorption process (see FIG. 4*a*), in the case of the ultrashort ultra-broadband source, excitation intensity is instead provided across the full spectral range, leading to resonant excitation conditions for all three dyes within the sample (FIG. 4*b*).

In one single SyncRGB scan, the position of the multiple dyes can therefore be retrieved simultaneously.

REFERENCES

1. Entenberg D, Wyckoff J, Gligorijevic B, Roussos E T, Verkhusha V V., Pollard J W, et al. Setup and use of a two-laser multiphoton microscope for multichannel intravital fluorescence imaging. Nat Protoc. 2011; 6(10):1500-20.
2. Mahou P, Zimmerley M, Loulier K, Matho K S, Labroille G, Morin X, et al. Multicolor two-photon tissue imaging by wavelength mixing. Nat Methods. 2012; 9(8):815-8.
3. Wang K, Liu T-M, Wu J, Horton N G, Lin C P, Xu C. Three-color femtosecond source for simultaneous excitation of three fluorescent proteins in two-photon fluorescence microscopy. Biomed Opt Express. 2012; 3(9):1972.
4. Li K-C, Huang L L H, Liang J-H, Chan M-C. Simple approach to three-color two-photon microscopy by a fiber-optic wavelength convertor. Biomed Opt Express. 2016; 7(11):4803.

5. J. R. Lakowicz, Henryk Szmacinski, Kazimierz Nowaczyk, Klaus W. Berndt, Michael Johnson, Fluorescence lifetime imaging, Analytical Biochemistry Volume 202, Issue 2, 1 May 1992, Pages 316-330)
6. Wolfgang Becker, Alex Bergmann, Christoph Biskup, Multispectral Fluorescence lifetime imaging by TCSPC, Microscopy research and technique (2007), 70; 403-409
7. Hildner, R., Brinks, D. & van Hulst, N. F. Femtosecond coherence and quantum control of single molecules at room temperature.Nat. Phys. 7, 172-177 (2010).
8. Brinks, D., Hildner, R., Stefani, F. D. & van Hulst, N. F. Coherent control of single molecules at room temperature. Faraday Discuss. 153, 51 (2011).
9. Hildner, R., Brinks, D., Nieder, J. B., Cogdell, R. J. & van Hulst, N. F. Quantum coherent energy transfer over varying pathways in single light-harvesting complexes TL—340. Science (80-). 340 VN-, 1448-1451 (2013).
10. Miranda M, Fordell T, Arnold C, L'Huillier A, Crespo H. Simultaneous compression and characterization of ultrashort laser pulses using chirped mirrors and glass wedges. Opt Express. 2012; 20(1):688.
11. Miranda M, Arnold C L, Fordell T, Silva F, Alonso B, Weigand R, et al. Characterization of broadband few-cycle laser pulses with the d-scan technique. Opt Express. 2012; 20(17):18732.

This description naturally does not impose any constraints on the embodiments presented in this document, and any person with average knowledge in this field will be able to foresee many possibilities for the modification thereof, without departing from the general idea as defined in the claims. The preferred embodiments described above may obviously be switched around in different ways. The following claims additionally define preferred embodiments.

The invention claimed is:

1. A method for simultaneous multicolor nonlinear imaging of multiple chromophores of different types in a sample, the method comprising:
   a) emitting ultrashort broadband light pulses from a few-cycle laser system for excitation of the multiple chromophores;
   b) focusing the ultrashort broadband light pulses in a sample plane of the sample;
   c) controlling the focused ultrashort broadband light pulses temporal duration in the sample plane;
   d) preventing the ultrashort broadband light pulses from directly reaching a detection system;
   e) measuring nonlinear signals generated in the sample plane;
   f) scanning the excitation and measurement on individual points (1D), or point-by-point in the sample plane (2D), or point-by-point across focal planes (3D);
   g) synchronizing the measurement of the non-linear signals generated in the sample plane to a detector in order to acquire time resolved nonlinear signal information on photon arrival time histograms from the sample plane;
   h) processing the time resolved nonlinear signal information;
   i) analyzing the time resolved non-linear signal information for determination of decay parameters associated to the photon arrival time histograms in the individual points (1D), or point-by-point in the sample plane (2D), or point-by-point across focal planes (3D).

2. The method according to claim 1, wherein the sample interacts with at least two photons from the ultrashort broadband light pulses generating a non-linear response comprising at least two photon fluorescence, higher harmonic generation, sum-frequency generation or difference-frequency generation.

3. The method according to claim 1, wherein the time resolved nonlinear signal information is obtained via Time-domain Fluorescence Lifetime imaging microscopy (FLIM) by gated image intensifiers, Frequency-domain FLIM, time correlated single photon counting or streak camera.

4. The method according to claim 1, wherein processing the time resolved nonlinear signal comprises any 1D, 2D or 3D image representation correlating measured non-linear signal information with a specific sample position.

5. A system configured to perform the method described in claim 1 for the simultaneous multicolour nonlinear imaging of multiple chromophores of different types in a sample, comprising:
   a) an excitation light system emitting laser pulses from a few-cycle laser system for the excitation of the multiple chromophores;
   b) a focusing element adjusted to produce a near diffraction-limited laser spot of said excitation laser pulses a sample plane;
   c) a pulse characterization and compression section configured to control the focused laser pulses to deliver near-transform-limited pulses at the sample plane;
   d) an optical element guiding the laser pulses to the sample plane and consequently direct the nonlinear signal to the detectors;
   e) an optical element preventing the laser pulses from directly reaching the detectors;
   f) a photon counting electronics configured to detect single photons and photon arrival times from the generated non-linear signal from the sample;
   g) a scanning section configured to perform excitation and measurement on individual points (1D) or point-by-point in the sample plane (2D) or point by point across focal planes (3D);
   h) a control section for correlation of the detection with the scanning in order to acquire nonlinear signal associated to the scanning position(s) at the sample plane;
   i) a signal processing section configured to provide information related with the time resolved nonlinear signal;
   j) an analysis section software configured to determine the decay parameters associated to the photon arrival time histograms in each of individual points (1D) or point-by-point in the sample plane (2D) or point by point across focal planes (3D).

6. The system according to claim 5, wherein the excitation light system comprises an ultrashort pulsed femtosecond laser with a spectrum configured to excite at least two fluorophores simultaneously.

7. The system according to claim 5, wherein the focusing element comprises one of the following optical elements: single lens, lens combinations, microscope objectives, immersion objectives, dipping objectives and focusing mirrors.

8. The system according to claim 5, wherein the pulse characterization and compression section configured to measure a spectral phase, and based on the spectral phase information, compressing the broadband excitation laser pulse to near Fourier-limited ultrashort durations at the sample plane.

9. The system according to claim 5, wherein the optical element (18) comprises at least one of the following optical elements: metal mirror, dichroic mirror, prism, grating, or combinations of these elements.

10. The system according to claim 5, wherein the optical element comprises at least one of a band pass, short pass and multiband optical filters, wavelength selective detection units, using dispersive elements, such as prisms and gratings or detectors with selective wavelength range sensitivity.

11. The system according to claim 5, wherein the photon counting detection section comprises a single photo multiplier tube (PMT), fast photodiode, avalanche photodiode, streak camera, Electron Multiplied Charge-Coupled Device (EM-CCD) or scientific Complementary Metal-Oxide-Semiconductor (sCMOS) sensor.

12. The system according to claim 5, wherein photon counting detectors comprise multiple detectors to detect specific spectral portions of the nonlinear signal from the sample.

13. The system according to claim 5, wherein the control section for correlation of the detection with the scanning is performed via a device control software, such that detected nonlinear signal from the sample plane can be correlated with the scanning position point(s) in 1D, 2D or 3D space.

14. The system according to claim 5, wherein the signal processing section correlates the time-resolved nonlinear signal with the sample position via a data processing software, or manually.

* * * * *